United States Patent [19]

Yan

[11] Patent Number: 5,380,442

[45] Date of Patent: Jan. 10, 1995

[54] REGENERATION OF USED STRETFORD SOLUTION FOR RECYCLE

[75] Inventor: Tsoung Y. Yan, Philadelphia, Pa.

[73] Assignee: Mobil Oil Corporation, Fairfax, Va.

[21] Appl. No.: 154,055

[22] Filed: Nov. 18, 1993

[51] Int. Cl.[6] .............................................. B01D 9/02
[52] U.S. Cl. .................................. 210/721; 210/763; 210/806
[58] Field of Search ............... 210/721, 763, 774, 806; 423/567.1

[56] References Cited

U.S. PATENT DOCUMENTS

| | | | |
|---|---|---|---|
| 3,959,452 | 5/1976 | Espenscheid et al. | 423/573 |
| 4,124,685 | 11/1978 | Tarhan et al. | 423/574 L |
| 4,360,508 | 11/1982 | Farrington et al. | 423/544 |
| 4,364,918 | 12/1982 | Espenscheid | 423/573 |
| 5,112,494 | 5/1992 | Yan | 210/668 |

OTHER PUBLICATIONS

"Unit Operations of Chemical Engineering", McCabe & Smith, pp. 875–880.

*Primary Examiner*—Frank Spear
*Attorney, Agent, or Firm*—Alexander J. McKillop; Malcolm D. Keen; Penny L. Prater

[57] ABSTRACT

Waste materials are removed from Stretford solution in the form of sulfates by catalytic oxidation. The Stretford solution, which was used to treat sulfur contaminated gas streams is first regenerated by oxidation to restore the vanadium present to a pentavalent form. It is then passed to a reaction zone where it is contacted with a catalyst and an oxygen source. The catalyst comprises a porous solid substrate on which a metal or metal compound insoluble in Stretford solution is deposited. Waste materials, primarily thiosulfates, are thus oxidized to sulfates. The effluent of the reaction zone is then passed to a crystallizer, where the sulfates are precipitated out as crystals of Glauber's salt. The Glauber's salt is recovered as a product and the Stretford solution is recycled to a scrubber for the treatment of gas streams.

18 Claims, 1 Drawing Sheet

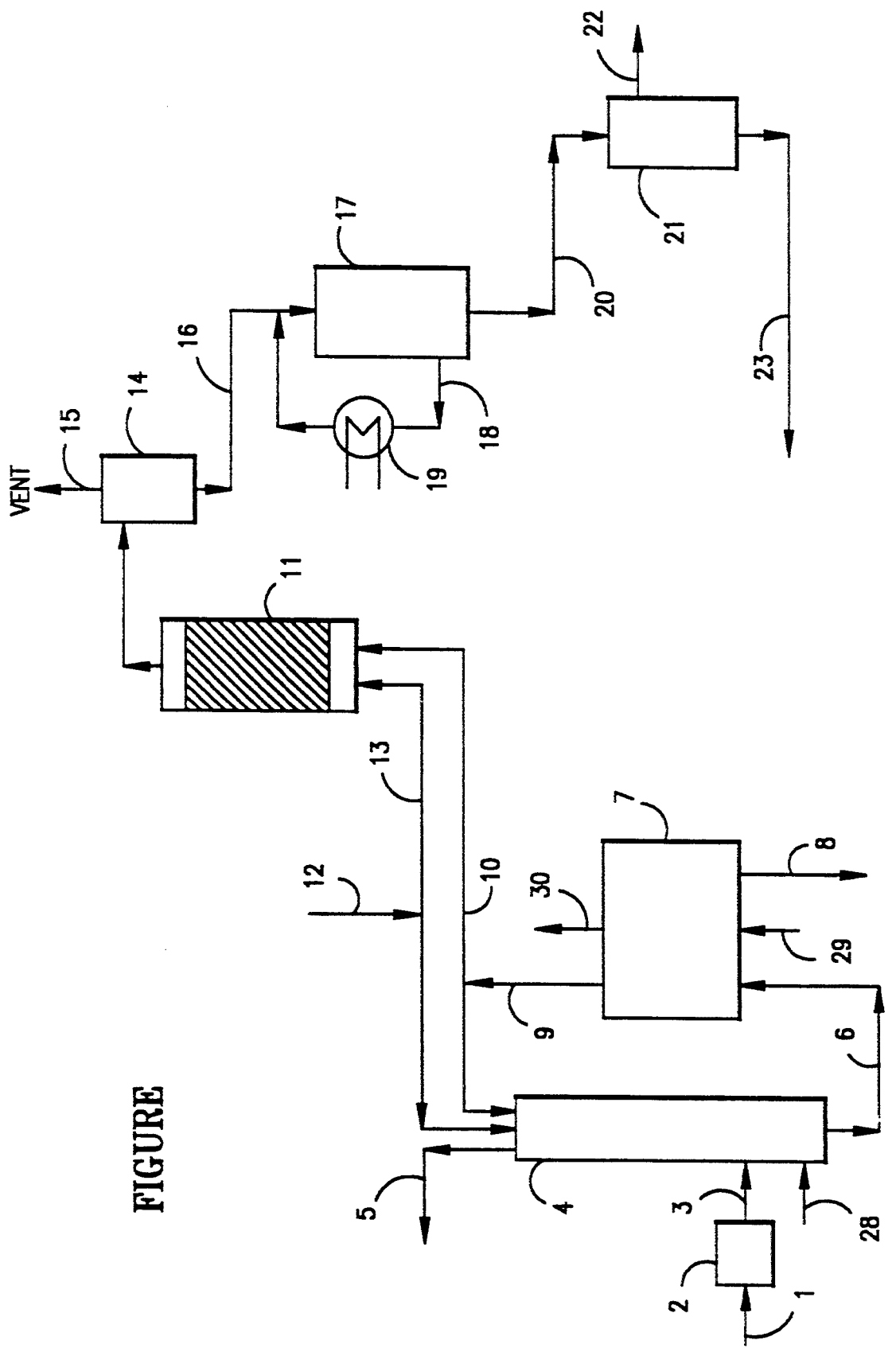
FIGURE

REGENERATION OF USED STRETFORD SOLUTION FOR RECYCLE

CROSS-REFERENCE TO RELATED APPLICATIONS

Copending patent application Ser. No. 08/061,127, which is incorporated by reference, discloses the catalytic oxidation of thiosulfates and other sulfur-containing substances in waste water.

FIELD OF THE INVENTION

The invention is directed to the removal of sulfur compounds from the used Stretford Solution in the form of sulfates. Sulfides and thiosulfates in the solution are catalytically oxidized to sulfates, which are crystallized and removed from the solution as valuable salts. The solution then is reclaimed for reuse.

BACKGROUND OF THE INVENTION

Low concentrations of sulfur contaminants occur in gas streams such as coke oven gas, natural gas, and the tail gas from the Claus process. The Claus process, which is widely used in petroleum refineries to convert hydrogen sulfide by-product to sulfur, generates large volumes of waste tail gas. Direct discharge of this gas, which contains residual $H_2S$, to the atmosphere results in pollution levels unacceptable to an increasing number of communities.

A highly effective process for removing low concentrations of hydrogen sulfide from contaminated gas streams is the Stretford process. In this method, the gas stream is contacted with aqueous sodium carbonate/bicarbonate solution that contains pentavalent vanadium and anthraquinonedisulfonic acids (ADA). The hydrogen sulfide is oxidized to sulfur with accompanying reduction of the vanadium and ADA. After the sulfur is removed, the used aqueous solution now containing tetravalent vanadium and reduced ADA is regenerated by oxidation with air and recycled to the gas absorber. The ADA also acts as a catalyst for the regeneration step. The net reaction is the indirect oxidation of hydrogen sulfide to form water and sulfur, which is recovered. The reactions can be represented as follows:

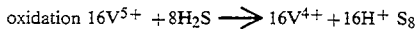

oxidation $16V^{5+} + 8H_2S \longrightarrow 16V^{4+} + 16H^+ + S_8$

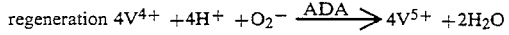

regeneration $4V^{4+} + 4H^+ + O_2^- \xrightarrow{ADA} 4V^{5+} + 2H_2O$

The process performs its intended function of removing hydrogen sulfide from waste gas streams or other gas streams such as natural gas quite effectively. Nonetheless, the process suffers a drawback. During each cycle of the process, a small percentage of sulfide is converted irreversibly to thiosulfate and to a lesser extent sulfate. Other waste materials, such as sulfites, mercaptans and disulfides may also be present. The accumulation of thiosulfate particularly reduces the solubility of vanadium and ADA in the solution, and decreases the rate of oxidative regeneration. Generally, thiosulfate levels in excess of about 25 wt % are very undesirable because both ADA and vanadate salts are largely salted out at these levels. To maintain the thiosulfate and sulfide salts at an acceptable level of 20–25 wt %, a continuous purge becomes necessary. This results in a loss of valuable chemicals: ADA, sodium vanadate, and sodium carbonate. More important, however, high thiosulfate concentrations present a serious problem for disposing of this purge stream because of their high chemical oxygen demand (COD).

Thiosulfate is stable and has high water solubility. The methods for its destruction and/or removal from the process stream are costly. Proposed processes for disposal of this effluent have included evaporation, incineration, and even biodegradation. All are unattractive economically, however.

DESCRIPTION OF THE PRIOR ART

The use of the Stretford process for the treatment of aqueous effluents was previously disclosed in U.S. Pat. No. 4,360,508 (Farrington, et.al.). U.S. Pat. No. 3,959,452 (Espenscheid, et al.) and U.S. Pat. No. 4,364,918 (Espenscheid) disclose the purification of a thiosulfate-containing purge stream generated in a Stretford-type process. In U.S. Pat. No. 3,959,452, the contaminated gas stream is treated with phosphoric or sulfuric acid and then with lime to recover vanadate salts, anthraquinone disulfonic acid salts, and alkali for reuse in the process. In U.S. Pat. No. 4,364,918, the contaminated gas stream is treated with a nickel ethylenediamine complex to remove thiosulfate as a nickel ethylenediamine precipitate. The precipitate is treated with acid to decompose the thiosulfate and then with lime to recover the nickel ethylenediamine complex for reuse.

U.S. Pat. No. 5,112,494 (Yan) discloses the removal of cyanide from waste water. Water is passed through an adsorbent porous solid substrate which has been treated with a water insoluble metal compound. An oxidizing agent is then supplied to the adsorbent to oxidize the adsorbed cyanide.

SUMMARY OF INVENTION

The instant invention employs improved methods for the reclamation of Stretford solution for recycle. As indicated supra, other methods were disclosed in Espencheid and Espencheid et al. In this invention, a slip-stream of used Stretford solution and air are fed to the reactor containing oxidation catalyst. The sulfides and thiosulfate in the solution are catalytically oxidized to sulfate by oxygen in the air according to the following reactions:

Thiosulfate:

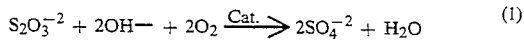

$$S_2O_3^{-2} + 2OH^- + 2O_2 \xrightarrow{Cat.} 2SO_4^{-2} + H_2O \qquad (1)$$

Sulfides:

$$S^{-2} + 2O_2 \xrightarrow{Cat.} SO_4^{-2} \qquad (2)$$

These reactions proceed to $SO_4^{-2}$ cleanly in basic solution at the pH of the used Stretford solution without acid/base adjustment. At the high pH of 8 and above, no elemental sulfur will be formed. Prior art processes such as those of Farrington et al., Espencheid, and Espencheid et al. require acidification, leading to high acid consumption and waste disposal problems. Such problems add to the expense of these processes.

The use of a catalyst is required in order to convert sulfides and thiosulfides to sulfates in an air oxidation reaction efficiently. The conversion rate of sulfide to thiosulfate in air is fairly rapid. The conversion rate of thiosulfate to sulfate, however, is extremely slow if a catalyst is not used. The type of catalyst employed is a metal or metallic compound, such as copper, impregnated on a porous, high surface area solid.

Sulfates are far less soluble than thiosulfates and therefore easier to remove by crystallization techniques. Sodium sulfate, decalydrate Glauber's salt ($Na_2SO_4.10H_2O$) is a commercially valuable product which may be removed by crystallization. The reclaimed Stretford solution may then be recycled to the Stretford process.

BRIEF DESCRIPTION OF THE DRAWINGS

The FIGURE is a schematic drawing of the Stretford process integrated with a process for the Reclamation of Used Stretford Solution.

DETAILED DESCRIPTION OF THE INVENTION

The FIGURE illustrates a process for the reclamation of used Stretford solution. A sulfur contaminated gas stream, such as the tail gas from the Claus process, which may contain up to about 2.0 wt % sulfur as $SO_2$, together with sufficient added hydrogen to reduce substantially all of the sulfur contaminant to hydrogen sulfide, is fed through line 1 to a catalytic reduction unit 2. The contaminated gas stream with the contaminant now in the form of hydrogen sulfide is passed via line 3 to one or more scrubber units, shown in the drawing as a single scrubber 4 where the contaminant is sorbed in the regenerable, reactive aqueous sorbent. The purified gas exits through line 5, and the aqueous sorbent and suspended sulfur passes via line 6 to a regeneration separation section 7 from which regenerated aqueous sorbent is returned to the scrubber 4 via line 9. Although the vanadium have been regenerated to a pentavalent form at this point, the Stretford solution is still considered "used" because it contains contaminating sulfur compounds which have not yet been oxidized. Air or oxygen gas is provided to the regeneration-separation section 7 via line 29 and unconsumed oxygen, if any, and/or nitrogen are vented via line 30. Make-up water, soda ash and vanadium salts, and acids that may be needed to adjust pH of the sorbent, are introduced as needed to the scrubber section 4 via line 28. Sulfur is recovered from the regeneration-separation section 7 via line 8. Used Stretford solution, which may be drawn off from line 6 prior to regeneration of the vanadium but is preferably drawn from line 9 as shown is passed via line 10 to fixed bed catalytic reaction zone 11. Used Stretford solution may also be returned to scrubber 4 via line 10. Although as much as 100% of the Stretford solution may be passed through the catalytic reaction zone 11, it is preferred that a slipstream of about the total solution to be oxidized be between 5% and about 20%. Air is passed from line 12 to line 13. Line 13 passes air to either the scrubber 4 or catalytic reaction zone 11. In catalytic reaction zone 11, thiosulfates and sulfides may be oxidized directly to sulfates. The illustration indicates the air and Stretford solution entering the reaction zone 11 as separate streams. They can however, be premixed prior to entering.

After oxidation in the reaction zone, the gas is separated from the treated effluent in separator 14 and is discharged through line 15 for additional treating, flaring, incineration, or recycling to the Claus process. The Stretford solution, now in "reclaimed" form is passed to the crystallization process through line 16 for the removal of Glauber's salt, sodium sulfate decahydrate ($Na_2SO_4.10H_2O$).

Sulfates, such as Glauber's salt are not as soluble in aqueous solutions, particularly at low temperatures, as sulfides and thiosulfates. The approximate solubilities at 0° C. (32° F.) are about 500 and 30 g/l for sodium thiosulfates and Glauber's salt, respectively. The salts in the solution can be removed by chilling the catalytically oxidized used solution to 30°–40° F. to form crystal of Glauber's salt. The salt is then separated from the Stretford solution by filtration or centrifugation.

In the FIGURE, the Stretford solution containing sulfates is passed to a crystallizer 17. A supersaturated solution must be created in the crystallizer for crystallization to occur. When crystallizing Glauber's salts, it is desirable to cool the solution to produce supersaturation. This is because Glauber salts are much less soluble at low temperatures than at high temperatures. Crystallizers operate in a variety of ways. Details concerning their operation are provided in *Unit Operations of Chemical Engineering*, by Warren L. McCabe and Julian C. Smith, pages 875-880. Commercial crystallizers may operate in either continuous or batch wise mode. The continuous mode is preferred. Crystals precipitate out of the supersaturated solution in crystallizers when the solution is contacted with other crystals. Crystallizers differ in the method in which crystals are brought in contact with supersaturated liquid.

In one technique, the circulating liquid method, a stream of supersaturated solution is passed through a fluidized bed of growing crystals, within which supersaturation is released by nucleation and growth. The saturated liquid then is pumped through a cooling or evaporating zone 19 via line 18, in which supersaturation is generated. The supersaturated solution is recycled through the crystallizing zone.

Magma is a two-phase mixture of mother liquor and crystals of all sizes, which occupies the crystallizer and which is withdrawn as a product. In the circulating magma method, the entire magma is circulated through both crystallization and supersaturation steps without separating the liquid from the solid. In this method supersaturation as well as crystallization occurs in the presence of crystals. In both methods, circulating liquid or circulating magma, feed solution is added to the circulating stream between the crystallizing and supersaturating zones.

The magma (even if the circulating liquid method is used, the material in line 20 is still magma) leaves the crystallizer 17 through line 20 and enters mechanical separation zone 21. This zone may be either a centrifuge or a filter. The crystals of Glauber's salt are separated from the Stretford solution and recovered as product through line 22. The reclaimed Stretford solution is recycled to the scrubber through line 23.

Catalyst and Reaction Conditions

The catalytic oxidation process of the instant invention employs a metal on a supported catalyst. The metals may be present on the support alone or in the forms of metal oxides, metal sulfides, and spinels. The metals useful in this process include copper, silver, cobalt, nickel, iron, molybdenum, tungsten, palladium and platinum. The catalyst may be fresh or used commercial catalyst. The use of used catalyst results in cost savings.

Commercial hydrotreating catalysts e.g. $NiMo/Al_2O_3$, $Mo/Al_2O_3$, can be used for oxidation as can hydrocracking catalysts, zeolites, or $SiO_2/Al_2O_3$ and reforming catalysts, e.g. Pt/Al$_2$O$_3$. If zeolites are employed, they may contain noble metals such as Pd or Pt, or metal combinations such as NiMO, NiW or CoMo. Hydrogenation catalysts, e.g. Pd/C, Ni/Kieselguhr, Pt/C, or Pt/Al$_2$O$_3$ can also be used in the process. The preferred catalyst is copper oxide on an alumina (Al$_2$O$_3$) substrate.

Absorbent substrates or supports which are useful in the method of this invention include porous, high surface area solids. A variety of porous solids can be employed for purposes of the invention. Non-limiting examples of porous solids for use herein include activated carbon, inorganic ion-exchange materials, polymeric resins (both gel and macro-reticulous types), zeolites, alumina, silica-alumina, titania, and zirconia.

Specific examples of the inorganic ion exchange materials include both the naturally occurring materials such as the mineral zeolites including mordenite, clinoptilolite, erionite, sepiolite, clays and synthetic material, which include Al$_2$O$_3$, SiO$_2$, SiO$_2$-Al$_2$O$_3$, synthetic zeolites such as zeolite A, zeolite X, zeolite Y, ZSM-5 and mordenite. The catalyst can be shaped in the form of extrudates, cylinders, multi-lobes, pellets, granules, or be structure shaped (similar to the packing of static mixers).

A packed bed provides an effective and efficient reactor. In the packed bed, the reaction zone proceeds along the direction of flow. To minimize the pressure drop across the bed and alleviate potential plugging by debris, the reactor can be operated with the bed expanded by greater than 5%. The reactor also can be operated at conditions for an ebullient bed, a fluidizing bed, or a spouting bed. The use of filters or guard beds may also be helpful to avoid plugging the catalyst bed.

Air, readily available, is the preferred oxidizing agent; however, other agents include ozone, hydrogen peroxide and molecular oxygen, O$_2$.

The reaction products are innocuous. The oxidized effluent proceeds to a crystallizer for the precipitation and recovery of Glauber's salts while the gas is treated, flared, or incinerated or recycled to the Claus process. Any skim oil present can be recovered in an oil-water separator, preferably a separator drum. The conditions to be maintained in reaction zone, where catalytic oxidation occurs are as follows:

| Process Variable | Broad Range | Preferred Range |
| --- | --- | --- |
| Pressure, psig | 0 to 1000 | 0 to 500 |
| Temperature, °F. | 50 to 400 | 75 to 300 |
| LHSV*, v/v Hr. | 0.1 to 100 | 0.5 to 20 |
| Air rate, X of Stoichrometric** | 1 to 100 | 1 to 10 |
| pH | 5 to 14 | 7.5 to 13 |
| Thiosulfate, conv. % | 10–100 | 50–100 |
| Splitstream, % of total | 5–100 | 5–20 |

*LHSV is liquid hourly space velocity.
**Stoichiometric requirement is calculated based on the oxidation reactions (1) and (2), illustrated supra.

The reaction zone contains the catalyst required for the present invention, discussed previously. The Stretford solution flows at a liquid hourly space velocity (LHSV) ranging from about 0.1 to about 100 hr$^{-1}$, preferably from about 0.5 to about 20 hr$^{-1}$. The rate of flow of the solution is attributable to the pressure imposed on the stream by the scrubber. This pressure is between 0 and 1000 psig, preferably between 0 and 500 psig. The reaction zone is maintained at the temperatures of the Stretford solution ranging from about 50° F. to about 400° F., preferably from about 75° F. to about 300° F. The amount of oxidizing agent mixed with the Stretford solution is sufficient to provide about 1 to about 100 (preferably about 1 to about 10) times the stoichiometric requirement for oxidizing the oxidizable components in the Stretford solution which include sulfides, sulfites, thiosulfates, mercaptans, and/or disulfides. Having described the invention broadly, the following example is offered as a specific illustration. It is illustrative only and is not intended to limit the invention:

EXAMPLE

The composition of used Stretford solution is as follows:

1.79 g/l ADA (anthroquinonedisulfonic acid)
0.84 g/l Vanadium
15 g/l Sodium thiosulfate
The pH of the Stretford solution is 8.7.

A reactor was filled with 10 ml of a catalyst composed of copper on a substrate of zeolite x (13x, sodium x or faujasite x). The copper content in the catalyst is 7.5 wt %. Used Stretford solution is pumped through the reactor at 20 ml/hr (2 LHSV), 10 psig, at 190° F. along with 6.2 l/hr of air (containing 3 times the stoichiometric requirement of 02). Analysis of the effluent indicates that sodium thiosulfate was reduced from 158 to 12 gl/. Sodium thiosulfate was oxidized to other materials, primarily Glauber's salt, at a conversion rate of 92 wt %. The effluent contained 262 g/l of Glauber's salt. After chilling of the effluent, 210 g/l of Glauber's salt was recovered.

What is claimed is:

1. A process for removing waste materials from Stretford solution, the solution having been regenerated by oxidation after use in a process for treating sulfur contaminated gas streams, the process for removing waste materials comprising the following steps:
   (a) feeding the Stretford solution and a source of oxygen into a reaction zone containing a catalyst, the catalyst comprising a porous solid substrate upon which a metal or metal compound insoluble in Stretford solution has been deposited;
   (b) contacting the Stretford solution and oxygen source with the catalyst, thereby catalytically oxidizing the waste materials to sulfates;
   (c) passing the Stretford solution containing sulfates to a crystallizer, wherein the sulfates are precipitated out as Na$_2$SO$_4$, crystals of Glauber's salt;
   (d) passing the mixture of Stretford solution and crystals to a separation zone, in which the crystals are removed from the Stretford solution;
   (e) returning the Stretford solution to the gas treatment process.

2. The process of claim 1, wherein the waste materials are selected from the group consisting of sulfides, thiosulfates, sulfites, mercaptans and disulfides.

3. The process of claim 1, in which the separation zone for the Glauber's salt and Stretford solution comprises a centrifuge apparatus.

4. The process of claim 1, in which the separation zone for the Glauber's salt and the Stretford solution comprises a filtration apparatus.

5. The process of claim 1, in which the metal component or components of the catalyst, found either in elemental form or in a compound, are selected from the group consisting of Cu, Ag, Ni, Mo, Co, Fe, W, Pd, and Pt.

6. The process of claim 5, in which the metal compound comprises a sulfide.

7. The process of claim 5, in which the metal compound comprises an oxide.

8. The process of claim 1, in which the porous solid substrate of the catalyst is selected from the group consisting of alumina, silica, activated carbon, zeolites, clay, titania, zirconia polymeric resins, and aluminophosphate.

9. The process of claim 6, in which the metal compound is selected from the group consisting of CuS, $Cu_2S$, AgS, $MoS_2$, NiS, $WS_2$ and combinations thereof.

10. The process of claim 7, in which the metal compound is selected from the group consisting of $Cu_2O$, CuO, or NiO, CoO, $Co_2O_3$, $WO_2$ and $MoO_2$.

11. The process of claim 1 in which the source of oxygen comprises air.

12. The process of claim 1 in which the source of oxygen comprises $H_2O_2$.

13. The process of claim 1 in which the Stretford solution is fed to the reaction zone at a liquid hourly space velocity of 0.1 $hr^{-1}$ to 100 $hr^{-1}$.

14. The process of claim 1 in which the catalytic oxidation occurs in the reaction zone at a pressure of from about 0 to about 1000 psig.

15. The process of claim 1 in which the catalytic oxidation occurs in the reaction zone at a temperature of from about 50° F. to about 400° F.

16. The process of claim 1 in which the oxygen source is fed into the reaction zone in proportion to the feed rate of waste of 1 to 100 mole $O_2$/mole of waste material.

17. The process of claim 11 in which the air is fed into the reaction zone in proportion to the feed rate of waste material of 1 to 100 mole $O_2$ in air/mole of waste material.

18. The process of claim 1, in which the Stretford solution and the oxygen source are completely mixed prior to entering the reaction zone where catalytic oxidation occurs.

* * * * *